United States Patent
Mahaffey

(10) Patent No.: US 8,108,933 B2
(45) Date of Patent: Jan. 31, 2012

(54) SYSTEM AND METHOD FOR ATTACK AND MALWARE PREVENTION

(75) Inventor: Kevin Mahaffey, San Diego, CA (US)

(73) Assignee: Lookout, Inc., San Francisco, CA (US)

( * ) Notice: Subject to any disclaimer, the term of this patent is extended or adjusted under 35 U.S.C. 154(b) by 490 days.

(21) Appl. No.: 12/255,621

(22) Filed: Oct. 21, 2008

(65) Prior Publication Data

US 2010/0100963 A1    Apr. 22, 2010

(51) Int. Cl.
  H04L 29/06   (2006.01)
  G06F 7/04    (2006.01)
  G06F 15/16   (2006.01)
  G06F 17/30   (2006.01)

(52) U.S. Cl. .............. 726/25; 726/3; 726/24; 709/203

(58) Field of Classification Search .............. None
See application file for complete search history.

(56) References Cited

U.S. PATENT DOCUMENTS

| | | |
|---|---|---|
| 5,319,776 A | 6/1994 | Hile et al. |
| 6,301,668 B1 | 10/2001 | Gleichauf et al. |
| 6,792,543 B2 | 9/2004 | Pak et al. |
| 6,959,184 B1 | 10/2005 | Byers et al. |
| 7,069,589 B2 | 6/2006 | Schmall et al. |
| 7,096,368 B2 | 8/2006 | Kouznetsov |
| 7,171,690 B2 | 1/2007 | Kouznetsov et al. |
| 7,210,168 B2 | 4/2007 | Hursey et al. |
| 7,237,264 B1 | 6/2007 | Graham et al. |
| 7,308,256 B2 | 12/2007 | Morota et al. |
| 7,376,969 B1 | 5/2008 | Njemanze et al. |
| 7,386,297 B2 | 6/2008 | An |
| 7,392,543 B2 | 6/2008 | Szor |
| 7,401,359 B2 | 7/2008 | Gartside et al. |
| 7,634,800 B2 | 12/2009 | Ide et al. |
| 7,774,637 B1 | 8/2010 | Beddoe et al. |
| 2001/0044339 A1 | 11/2001 | Cordero et al. |
| 2002/0042886 A1 | 4/2002 | Lahti et al. |

(Continued)

FOREIGN PATENT DOCUMENTS

WO    WO2005101789    10/2005

OTHER PUBLICATIONS

International Search Report and Written Opinion dated Mar. 24, 2010 for PCT Application No. PCT/US2009/061372.

(Continued)

*Primary Examiner* — Shin-Hon Chen
(74) *Attorney, Agent, or Firm* — Dergosits & Noah LLP

(57) ABSTRACT

The present invention is a system and method for detecting and preventing attacks and malware on mobile devices such as a cell phones, smartphones or PDAs, which are significantly limited in power consumption, computational power, and memory. The invention enables mobile devices to analyze network data, executable data files, and non-executable data files in order to detect and prevent both known and unknown attacks and malware over vectors that are not typically protected by desktop and server security systems. Security analysis is performed by a combination of "known good," "known bad," and decision components. The invention identifies known good executables and/or known characteristics of network data or data files that must be present in order for the data to be considered good. Furthermore, known good and known bad identifier databases may be stored on a server which may be queried by a mobile device.

11 Claims, 3 Drawing Sheets

U.S. PATENT DOCUMENTS

| | | | |
|---|---|---|---|
| 2002/0183060 | A1 | 12/2002 | Ko et al. |
| 2003/0028803 | A1 | 2/2003 | Bunker et al. |
| 2003/0115485 | A1 | 6/2003 | Milliken |
| 2003/0120951 | A1 | 6/2003 | Gartside et al. |
| 2004/0185900 | A1 | 9/2004 | McElveen |
| 2005/0138395 | A1 | 6/2005 | Benco et al. |
| 2005/0237970 | A1 | 10/2005 | Inoue |
| 2005/0278777 | A1 | 12/2005 | Loza |
| 2006/0130145 | A1 | 6/2006 | Choi et al. |
| 2007/0016953 | A1 | 1/2007 | Morris et al. |
| 2007/0016955 | A1 | 1/2007 | Goldberg et al. |
| 2007/0028304 | A1 | 2/2007 | Brennan |
| 2007/0186282 | A1 | 8/2007 | Jenkins |
| 2007/0214504 | A1 | 9/2007 | Milani Comparetti et al. |
| 2007/0240218 | A1* | 10/2007 | Tuvell et al. ............ 726/24 |
| 2007/0240221 | A1* | 10/2007 | Tuvell et al. ............ 726/24 |
| 2007/0240222 | A1* | 10/2007 | Tuvell et al. ............ 726/24 |
| 2007/0293263 | A1 | 12/2007 | Eslambolchi et al. |
| 2008/0047007 | A1 | 2/2008 | Satkunanathan et al. |
| 2008/0072329 | A1 | 3/2008 | Herschaft |
| 2008/0086773 | A1 | 4/2008 | Tuvell et al. |
| 2008/0086776 | A1 | 4/2008 | Tuvell et al. |
| 2008/0109871 | A1 | 5/2008 | Jacobs |
| 2008/0127334 | A1 | 5/2008 | Gassoway |
| 2008/0127336 | A1 | 5/2008 | Sun et al. |
| 2008/0134281 | A1 | 6/2008 | Shinde et al. |
| 2008/0148381 | A1 | 6/2008 | Aaron |
| 2008/0178294 | A1 | 7/2008 | Hu et al. |
| 2008/0196104 | A1 | 8/2008 | Tuvell et al. |
| 2008/0200160 | A1 | 8/2008 | Fitzpatrick et al. |
| 2008/0209557 | A1 | 8/2008 | Herley et al. |
| 2008/0276111 | A1 | 11/2008 | Jacoby et al. |
| 2009/0199298 | A1 | 8/2009 | Miliefsky |
| 2010/0064341 | A1 | 3/2010 | Aldera |
| 2010/0154032 | A1* | 6/2010 | Ollmann ............ 726/3 |
| 2010/0313270 | A1* | 12/2010 | Kim et al. ............ 726/24 |
| 2010/0332593 | A1* | 12/2010 | Barash et al. ............ 709/203 |

OTHER PUBLICATIONS

Wikipedia Java Virtual Machine.
Wikipedia Firefox Browser.
'Dashwire: Manage Your Cell Phone on the Web, News Blog, Jessica Dolcourt, Oct. 29, 2007 5:00 AM PCT pp. 1-3.
MobileWipe web page, pp. 1-4.
"Real world Computing" Jun. 16, 2008 (PC Pro) pp. 1-2.
"PhoneBak PDA Phone Anti-theft software for your PDA phone", 2007 Bak2u Pte (Singapore), pp. 1-3.
"PhoneBak PDA: Mobile Phone Theft Recovery Software", 2007 Westin Tech.
"F-Secure Mobile Security for S60 User's Guide", pp. 1-34.
"Kaspersky Mobile Security", 1997-2007 Kaspersky Lab.
Berry Locator web p. 2007.
Notification of Transmittal of the International Search Report and the Written Opinion of the International Searching Authority, of the Declaration for PCTUS2009/061370 mailed on Dec. 14, 2009.
U.S. Appl. No. 13/160,447. Prosecution history available via USPTO IFW.
U.S. Appl. No. 13/162,477. Prosecution history available via USPTO IFW.
U.S. Appl. No.13/160,382. Prosecution history available via USPTO IFW.
U.S. Appl. No. 12/876,018. Prosecution history available via USPTO IFW.
U.S. Appl. No. 12/868,676. Prosecution history available via USPTO IFW.
U.S. Appl. No. 12/868,672. Prosecution history available via USPTO IFW.
U.S. Appl. No. 12/621,431. Prosecution history available via USPTO IFW.
U.S. Appl. No. 12/868,669. Prosecution history available via USPTO IFW.
U.S. Appl. No. 12/372,719. Prosecution history available via USPTO IFW.
TippingPoint Security Management System http://www.tippingpoint.com/products_sms.html.
Stay Secure by grafio http://widgets.opera.com/widget/4495/.
Symantec Endpoint Security, data sheet and product screen shot http://www.symantec.com/business/products/family.jsp?familyid=endpointsecurity.
Symantec Mobile Security Suite for Windows Mobile, data sheet and product screen shots http://www.symantec.com/business/products/sysreq.jsp?pcid=2241&pvid=mobile_security_suite_1.
Symantec Norton Smartphone security http://www.symantec.com/norton/smartphone-security.
Notification of Transmittal of the International Search Report and the Written Opinion of the International Searching Authority, of the Declaration for PCTUS2009/061372 mailed on Mar. 24, 2010.
U.S. Appl. No. 13/212,055. Prosecution history available via USPTO IFW.
U.S. Appl. No. 13/033,025. Prosecution history available via USPTO IFW.
U.S. Appl. No. 12/255,614. Prosecution history available via USPTO IFW.
U.S. Appl. No. 12/255,626. Prosecution history available via USPTO IFW.
U.S. Appl. No. 12/255,632. Prosecution history available via USPTO IFW.
U.S. Appl. No. 12/255,635. Prosecution history available via USPTO IFW.
U.S. Appl. No. 12/255,626. Prosecution history available via USPTO IFW (including Office Action dated Feb. 1, 2011 and references cited.).
U.S. Appl. No. 12/255,632. Prosecution history available via USPTO IFW (including Office Action dated Apr. 13, 2011 and references cited.).
U.S. Appl. No. 12/255,635. Prosecution history available via USPTO IFW (including Office Action dated Mar. 24, 2011 and references cited.).
U.S. Appl. No. 12/255,614. Prosecution history available via USPTO IFW (including Office Action dated Apr. 14, 2011 and references cited.).
McAfee, Internet Archive, Way Back Machine, available at <http://web.archive.org/web/20080517102505/www.mcafeesecure.com/us/technology-intro.jsp>, retrieved Feb. 23, 2011, 2 pages.
Qualys, "Executive Dashbard," Internet Archive, Way Back Machine, available at <http://web.archive.org/web/20080507161417/ www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web20080611095201/www.qualys.com/solutions/vulnerability_management> retrieved Feb. 24, 2011, 1 page.
Teh, Joe, "Norton 360 Version 3.0 Review," Mar. 9, 2009, available at <http://techielobang.com/blog/2009/03/09/norton-360-version-30-review/> retrieved Feb. 23, 2011, 12 pages.
Windows Update, Internet Archive, Way Back Machine, available at <http://web.archive.org/web/20071022193017/http://en.wikipedia.org/wiki/Windows_Update> retrieved Feb. 23, 2011, 3 pages.

* cited by examiner

US 8,108,933 B2

SYSTEM AND METHOD FOR ATTACK AND MALWARE PREVENTION

CROSS REFERENCE TO RELATED APPLICATIONS

The present application is related to the following co-pending U.S. patent applications: U.S. patent application Ser. No., 12/255,635 filed Oct. 21, 2008, entitled "SECURITY STATUS AND INFORMATION DISPLAY SYSTEM," U.S. application Ser. No., 12/255,632 filed Oct. 21, 2008, entitled "SECURE MOBILE PLATFORM SYSTEM," U.S. patent application Ser. No., 12/255,626 filed Oct. 21, 2008, entitled "SYSTEM AND METHOD FOR A MOBILE CROSS-PLATFORM SOFTWARE SYSTEM," and U.S. patent application Ser. No., 12/255,614 filed Oct. 21, 2008, entitled "SYSTEM AND METHOD FOR MONITORING AND ANALYZING MULTIPLE INTERFACES AND MULTIPLE PROTOCOLS," all of which are hereby incorporated by reference.

FIELD

The present invention relates generally to data security, specifically, to preventing and detecting attacks on a mobile communications device.

BACKGROUND

There are many ways for protecting computing assets from the harmful effects of viruses, malware, adware, exploits, and other computer contaminants (also known collectively as "attacks"). Desktop, laptop and server computers enjoy numerous antivirus, network, and similar security software products that are able to detect security threats such as exploits, viruses, and malware. The detection of known viruses and malware often involves identifying the software code signatures or definitions of known viruses and malware, storing these signatures or definitions in a database on the computer, and comparing data with these signatures or definitions in order to determine whether or not the data contains a virus or malware. Detecting previously unknown viruses and malware may often involves analyzing data for certain characteristics or emulating the execution of data to determine what it would do if allowed to run on the host system. Identifying new attacks is a matter of updating a virus definition or virus signature database on the computer or modifying the rules associated with an unknown virus/malware detection system. This is feasible since computers have the hardware, software and memory resources to store and manage vast virus signature databases, as well as the processing resources to perform complicated analyses and emulate an execution environment. The detection of exploits or other attacks that can compromise a computer via a network often involves identifying the signatures of known exploits or attack, storing a database of signatures on the computer being protected, and comparing network data to these signatures in order to determine if the data contains a security threat. Like virus and malware signatures, network attack signatures can be updated in order to detect new security threats. As mentioned previously, such a system is made possible because computers have the computational and storage resources available to manage large attack signature databases and compare network data to many signatures before approving it.

Mobile communications devices lack the same power as computers, though they are often designed to provide some of the same functionalities as computers in a portable form. In order to provide these functionalities, mobile communications devices often retain a mobile or portable version of a desktop computer operating system or system architecture, such as Windows Mobile®, Apple OS X iPhone™ or Java® ME. As a result, some attacks directed to a traditional computer can easily translate or be modified to harm a mobile communications device. Additionally, the number and types of attacks specifically directed to the mobile communications device platform is growing.

Detecting attacks on a mobile communications device presents challenges not found on traditional computing platforms. As previously mentioned, mobile communications devices lack the hardware, software and memory resources of a traditional computer. As such, storing vast signature databases on the mobile communications device is not feasible, and running complicated analysis systems strains the device's memory, battery, and CPU. Other security solutions have been found unsuccessful at detecting attacks specifically directed to a mobile communications device, since mobile communications devices provide functionalities not found on traditional computers. For example, a mobile communications device may be attacked via network data, files, or executables received over various network interfaces such as Bluetooth, Wi-Fi, infrared, or cellular networks.

The lack of robust antivirus and attack preventative measures on mobile communications devices has serious security implications. Mobile devices are part of a critical infrastructure: as people depend on such devices to communicate, transmit and receive data, and access Internet and intranet websites, it becomes more important that these devices remain secure. If not protected, a significant portion of mobile devices may be vulnerable to criminal or cyber-terrorist attacks that could disrupt the normal functioning of both commerce and government. One skilled in the art could easily disrupt vital communications, use mobile communications devices to hack into supposedly secure servers storing confidential information, steal money via mobile payment mechanisms, or perform a host of other malicious and nefarious acts.

What is therefore needed is a way to prevent attacks and protect mobile communications devices without sacrificing device performance.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention is a system and method for evaluating data on a mobile communications device to determine if it presents a security threat. In an embodiment, the present invention provides a mobile communications device with a mechanism for rejecting data that is immediately recognized to be an attack, and for allowing receipt of data recognized to be safe. In addition, the present invention provides a way for the mobile communications device to evaluate data that is not immediately recognized as safe or malicious. The present invention functions on a mobile communications device notwithstanding any hardware, software or memory constraints inherent in the device. As used herein, a "mobile communications device" may refer to a cell phone, handset, smartphone, PDA, and the like. A mobile communications device may primarily be used for voice communications, but may also be equipped to receive and transmit data, including email, text messages, video, and other data. This data may be received as packets or streams.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

A. System Architecture

Figure 1:
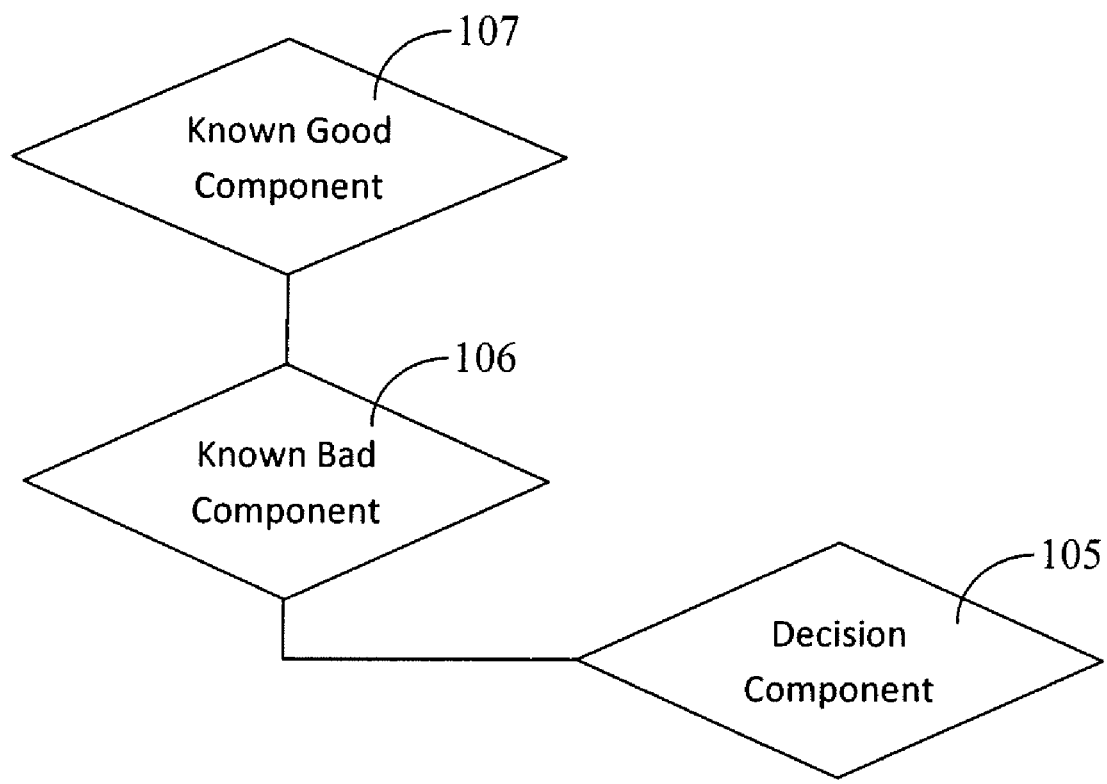
FIG. 1 is an exemplary block diagram depicting one embodiment of the present invention.

In an embodiment, the present invention is comprised of at least three software components resident on a mobile communications device. As shown in FIG. 1, a first component 107 may be used to recognize data that is safe, or "known good." A second component 106 may be used to recognize data that is malicious, or "known bad." A third component 105 is a decision component that may be used to evaluate data that is neither known good nor known bad. Each of these components is discussed in more detail below.

One will appreciate that as referred to herein, data may include network data, files, executable and non-executable applications, emails and other types of objects that can be transmitted to or received by a mobile communications device. Mobile communications devices typically transmit and receive data through one or more network interfaces, including Bluetooth, WiFi, infrared, radio receivers, and the like. Similarly, data may be encapsulated in a layered communications protocol or set of protocols, such as TCP/IP, HTTP, Bluetooth, and the like. In order to evaluate the security threat level of the data, it may be necessary to identify or parse the one or more protocols used to encapsulate the data. This may be done using a system such as the one described in co-pending U.S. patent application Ser. No. 12/255,614, entitled "SYSTEM AND METHOD FOR MONITORING AND ANALYZING MULTIPLE INTERFACES AND MULTIPLE PROTOCOLS," which is incorporated in full herein.

In addition, one will appreciate that data can vary in size and complexity depending upon its source, destination and purpose. It may be difficult to analyze received data objects as a whole; therefore, in order to optimize resources on the mobile communications device platform, the present invention may apply hashing functions or hashing algorithms to the received data. A hashing algorithm will transform the data into a fixed length identifier for easier evaluation. Applying the hash function may be performed by any of the components in the system illustrated in FIG. 1, or alternatively, may simply be performed by the system itself.

Hashed data may then be submitted to some or all of the three components for categorization and further action, if necessary. For example, the known good component 107 may have access to or may associate with a stored database of known good hash identifiers. As discussed herein, the database may be a data store or table of known good hash identifiers, or may be logic providing a comparison against hash identifiers for known good data. When data is analyzed by the mobile communications device, it may be quickly hashed and compared against this stored database by the known good component. This database may include identifiers for data that has been analyzed before and been deemed safe, originates from a trustworthy source, or simply recognized as good based upon its characteristics. This may include an examination of the data's structure, statefulness, purported source and destination, etc. If there is a match against the known good hash identifier database, then the data may be categorized as known good, and no further analysis is necessary. This data may then be allowed to pass to its intended destination for processing, execution or other operation.

A person skilled in the art will appreciate that since the total number of known good applications for mobile communications devices is small, use of the known good component 107 coupled to a database of known good application identifiers may significantly reduce false-positive malware detection. One will also appreciate that use of a known good component 107 may be particularly effective for data that contains executable software code. Executable software code for a given application rarely changes between different mobile communications devices, so creating a database of known good hash identifiers or logic for evaluating known good hash identifiers may be an effective method for recognizing safe or trustworthy data. This database may vary in size depending upon the resources available on the mobile communications device. Alternatively, aspects of the present invention, such as the known good component, may have access to a remote server with a larger library of hash identifiers for known good data or applications. Additionally, as discussed further in the next section, known good component 107 may be able to evaluate the security of data depending upon whether the data possesses sufficient characteristics common to other known good data.

The second component of the system embodiment of the present invention may include a component capable of recognizing if received data is malicious, or "known bad" (106 in FIG. 1). Known bad component 106 may have access to a database, logic or other data store containing information on known attack signatures or definitions that can be stored on the mobile communications device without occupying a significant amount of memory. For example, virus or other malware signatures can be reduced to hashing identifiers and stored in a database. In other words, there may be a known bad hash identifier database that complements the known good hash identifier database stored on the mobile communications device. Additionally or alternatively, known bad component 106 may be capable of identifying malware using characteristics common to other malicious software code. When applied to network data or data files, known bad component 106 may have access to a database containing patterns or other characteristics of a protocol data unit or file format which presents a security threat. Similar to the known good component 107 and database, any data identified as containing malware may be deleted, quarantined, or rejected from further processing by the mobile communications device. If a known bad data object is detected, the present invention may also display a notification or other message similar to that described in co-pending U.S. patent application Ser. No. 12/255,635, entitled "SECURITY STATUS AND INFORMATION DISPLAY SYSTEM," incorporated in full herein.

The third component of the system embodiment of the present invention may be a decision component 105. This component may be used to evaluate data that cannot be characterized as either known good or known bad. Since a majority of the data received on the mobile communications device may fall within this category, this component may utilize most of the resources allocated to the system embodiment of the present invention. This component may apply fuzzy logic, heuristic or other methods of analysis in order to determine whether received data may be passed to its intended destination, or rejected to prevent harm from befalling the device. Examples of this analysis are discussed below.

One will appreciate that the system embodiment may exist independently on a mobile communications device, or may be incorporated into an existing security system on the mobile communications device such as the one in co-pending U.S. patent application Ser. No. 12/255,614. One will also appreciate that in order to implement the present invention on a variety of mobile communications device platforms, it may be necessary to program aspects of the present invention using a cross-platform system, such as the one disclosed in co-pending U.S. patent application Ser. No. 12/255,626, entitled "SYSTEM AND METHOD FOR A MOBILE CROSS PLATFORM SOFTWARE SYSTEM," incorporated in full herein. In addition, aspects of the present invention may be used to determine a security state for a mobile communications device, as is described in co-pending U.S. patent application Ser. No. 12/255,632, entitled "SECURE MOBILE PLATFORM SYSTEM," incorporated in full herein.

One will also appreciate that while the present invention is disclosed as installed on a mobile communications device, portions of the present invention may communicate or work in conjunction with a remote server or a series of servers. For example, the system embodiment of the present invention may be configured to update its virus definitions or compare received data against a larger virus signature database on a remote server. Alternatively, the mobile communications device may be configured to send a hash identifier for received data to one or more servers for analysis and/or evaluation. One server may contain the known good component 107, known bad component 106 and decision component 105 of the present invention, or the components may be distributed across two or more servers. The one or more servers may thereby perform the analysis using the hash identifier, and if analysis reveals that the hash identifier identifies recognizably safe data, then the one or more servers may notify the mobile communications device or instruct the device that it may accept and process the data. If the analysis reveals that the hash identifier identifies recognizably malicious data, then the one or more servers may notify the mobile communications device or instruct the device to reject the data and not process it further. If the analysis is inconclusive, then the one or more servers may request that the mobile communications device send the data identified by the hash identifier to a server for further analysis. Further analysis may be performed by a decision component 105 or manually. One will appreciate that other variations are possible without departing from this disclosure or the scope of the present invention.

B. Malware and Attack Detection Using Data Characteristics

The system architecture discussed above offers an improvement over prior art mobile communications device security systems that typically only include a known good detection method or a known bad detection method. Because the present invention incorporates a decision component 105 as well, it minimizes false-positive or false-negative detection errors common to prior art systems. Other advantages and improvements are discussed in this section that describes some of the analyses performed by the system embodiment of the present invention.

1. Known Good Characteristics In an embodiment, the present invention may be configured to recognize good characteristics that all known good data should possess. Analyzing data for good characteristics may include the equivalent of applying a database or other data store of known good characteristics or logic asserting known good characteristics, and performing a comparison against the database. Alternatively or additionally, analyzing data for good characteristics may include the equivalent of applying logic asserting known good characteristics. The database or logic may not include all of the characteristics that may determine if data is good; however, if the data object lacks key known good characteristics, then the system can conclude that the data may be malicious and should be further analyzed, or alternatively, rejected outright. The database of known good characteristics or logic asserting known good characteristic may supplant the known good component 107 discussed above, or in some cases may replace it as a lightweight alternative. In other words, a list of all the known good data files and network data may be infinitely large, but the list of characteristics common to known good data files and known good network data may be much smaller. As such, the database of known good characteristics may be smaller in size than the known good database, and may therefore be more practical in mobile communications devices with less memory or processing resources.

One will appreciate that there are a number of characteristics common to known good data, but that these characteristics may differ depending upon whether the data is network data, a data file, or executable data. The present invention is able to evaluate all types of data receivable by a mobile communications device. For example, network data and data files may be examined for structure and state. This may involve checking the data against its associated metadata to confirm that the size, type and description match the data being described. Using this analysis, known good component 107 may be configured to allow or accept data that has valid statefulness and structure, and provide data that does not pass these tests to the known bad component 106 for further analysis or simply reject it outright. One will appreciate, however, that having valid statefulness and structure are not alone enough for concluding that a data file or network data is good, and further analysis by known bad component 106 and/or decision component 105 may be necessary. In other words, even though data analyzed by known good component 107 may result in a positive match finding that the data has recognizably good characteristics, or has a hash identifier matching known good data, the data may still be analyzed by known bad component 106 and/or decision component 105.

With regards to executable data, the list of known good executable applications for mobile communications devices is small. As such, known good component 107 may simply compare hash identifiers for gathered executable data and compare them against a stored database of known good executables. One will appreciate that other methods, such as validating the structure of an executable file format or validating any cryptographic signatures on an executable may be applied as well.

2. Known Bad Characteristics

In an embodiment, data may be compared using logic or a database or other data store of known bad characteristics. As such, if data has known bad characteristics, it may be considered malicious and may be rejected, deleted or quarantined. One will appreciate that the entire data object may have known bad characteristics, or part of the data object may have known bad characteristics, or a pattern in an object may be recognized as known bad, or the data object may yield a positive result from logic that performs a specific test for known bad characteristics. In such situations, it may warrant further analysis or confirmation to avoid an inaccurate result. Further analysis protects against situations in which the present invention may not recognize a specifically malicious data object that has not been recognized as such before. It is preferable to avoid mistakenly characterizing an object as more good than bad if it presents a security threat. Data that is recognized as known good, or is recognized has having sufficient known good characteristics, may be passed on to its intended destination. Data that fails to have all of the characteristics of a known good file or application, is found to be more bad than good, or is simply unrecognized may be passed along to the decision component 105 for further analysis.

As noted previously, data may be analyzed differently depending upon whether it is network data, file data, or executable data. Network data and file data may be encapsulated in various multi-layer protocols or formats. These protocols or formats may be analyzed using the system and methods described in co-pending U.S. patent application Ser. No. 12/255,614. If any of the data has known bad violations of its purported protocol or format, contains anomalous content or state transitions, or is invalid for the processor or subsystem to which it is directed, then known bad component 106 may reject this data as potentially malicious.

Known bad executables may be evaluated using full hash signatures, a string match anywhere or at a relative or absolute offset in the file, or a pattern anywhere or at a certain offset in the file consistent with known pieces or families of malware. If any of these characteristics are encountered, then the known bad component 106 may identify the data as malware and reject it. One will appreciate that other methods for detecting known bad data may be used as well, including but not limited to blocking executables which utilize a piece or specific combination of privileged functionality, or blocking executables which a server deems to have access frequency characteristics across many mobile devices indicative of viruses or malware.

3. Further Analysis

In some instances, data may not be immediately recognized as known good or known bad, and so decision component 105 may be used. One will appreciate that a key aspect of the present invention is its ability to analyze data that is not immediately known good or known bad. As mentioned above, this may require an analysis to determine if data is more good than bad, or more bad than good. As such, the present invention provides a sliding scale with which to assess the degree of how good or how bad received data may be. This permits a more precise measurement of not only how data may or may not harm a mobile communications device, but in light of this data, how the overall security state of the device may change.

The decision component 105 may utilize one or more types of internal decision systems to characterize whether data is good or bad. The decision component 105 is designed to detect security threats without specific signatures for the threats being protected against. In other words, decision component 105 may operate as an additional security component to compensate for any weaknesses from known good component 107 or known bad component 106.

One will appreciate that there are a number of decision systems that may be utilized by decision component 105, including but not limited to heuristic algorithms, rule-based or non-rule-based expert systems, fuzzy logic systems, neural networks, or other systems that may be used to classify a subject. In an embodiment, decision component 105 can analyze network data or files for possible security threats. For example, a fuzzy system may be configured to analyze the timing related to authentication actions over a given protocol, such as Bluetooth. A remote device connected to the local device via Bluetooth may repeatedly try to request access to a privileged resource on a device. Each time the remote device sends an authentication request, a window may pop up on the target device that requires user action before normal device interaction can resume. Because there is often no rate limiting built into the Bluetooth authentication system of mobile phones, a remote device can continue interrupting the local user by requesting access to the privileged resource and until the local user becomes frustrated and simply grants the request.

A fuzzy system can analyze data such as the timings between authentication requests, the results of previous authentication requests, and the time required for the user to respond to previous authentication requests. Such a system can detect when a remote device is attempting to repeatedly request authorization and the user is denying it quickly to prevent a situation where the user becomes frustrated and grants privileged access on his or her device to a remote attacker. Such a system can also be used to detect denial of service attacks, port scans, or other attacks that have a significant temporal component.

In another example, a heuristic algorithm may be used to detect the presence of shellcode in a data packet, stream, or data file in which none is expected. Such shellcode may be indicative that the data contains an exploit designed to perform a memory corruption attack where the attacker aims to have the supplied shellcode executed by the target device's processor.

In another example, the decision component 105 may contain a system for detecting anomalies in protocol behavior or file content so as to catch security threats that rely on unforeseen, yet out-of-the-ordinary mechanisms.

In another example, the decision component 105 may contain a system for analyzing authentication or other strings in network data or files that may be used to "socially engineer" a user. "Social engineering" attacks often manipulate the user into performing an action that is not in his or her best interest by using false information or otherwise presenting information to the user that he or she may interpret as legitimate but, in fact, is not. Such a system can examine the content of strings to determine if the data is of legitimate origin or is a potential social engineering attack. Examples of attacks this type of system may stop include: "phishing," "SMS phishing," Bluetooth device name manipulation, and others.

In an embodiment, the decision component 105 may analyze applications, libraries, or other executables on a mobile communications device. In an example, the decision component 105 may contain a neural network which analyzes characteristics of an executable and determines a security assessment based on pre-set connection characteristics. Such characteristics may be determined based on information contained in the executable file format or as a result of processing the content of the executable file.

In an example, the decision component 105 may contain a virtual machine-based decision system by which an executable can be classified by a set of rules that may be updated independently of the decision component itself. Such a system is able to add new logic to detect certain new classes of viruses on the fly without having to update the whole decision component. The system may pre-process the executable so that the virtual machine's logic can symbolically reference the executable rather than having to process the executable itself.

In an example, the decision component 105 may contain an expert-system which analyzes the behavior of an executable through function calls, system calls or actions an executable may take on an operating system. If an executable accesses sensitive system calls in a way that signifies malicious behavior, the system may flag that executable as potential malware and action may be taken.

The above examples illustrate how decision component 105 may utilize a number of analytical methods in order to fully evaluate the threat level of data received by or transmitted from the mobile communications device. Other examples may be contemplated without departing from the scope of this disclosure or the spirit of the present invention.

C. Data Analysis

Figure 2:
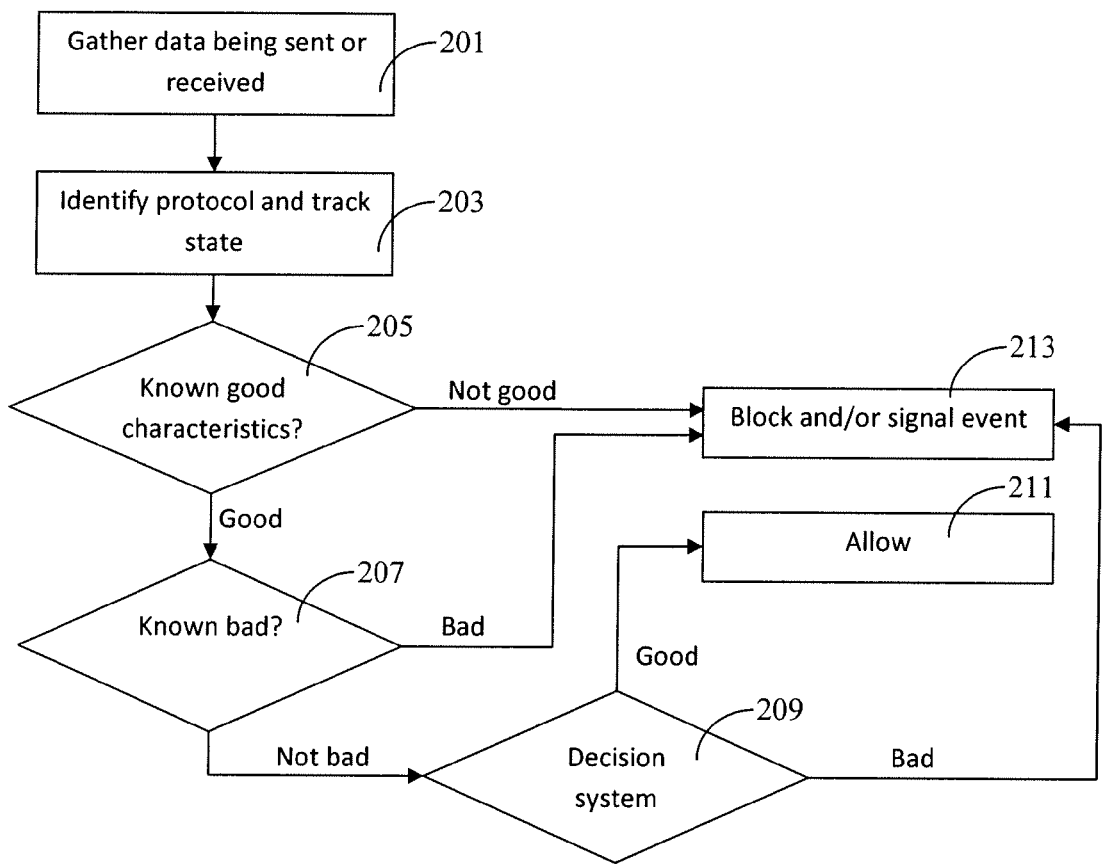
FIG. 2 is an exemplary flow diagram illustrating the steps of an embodiment of the present invention.
Figure 3:
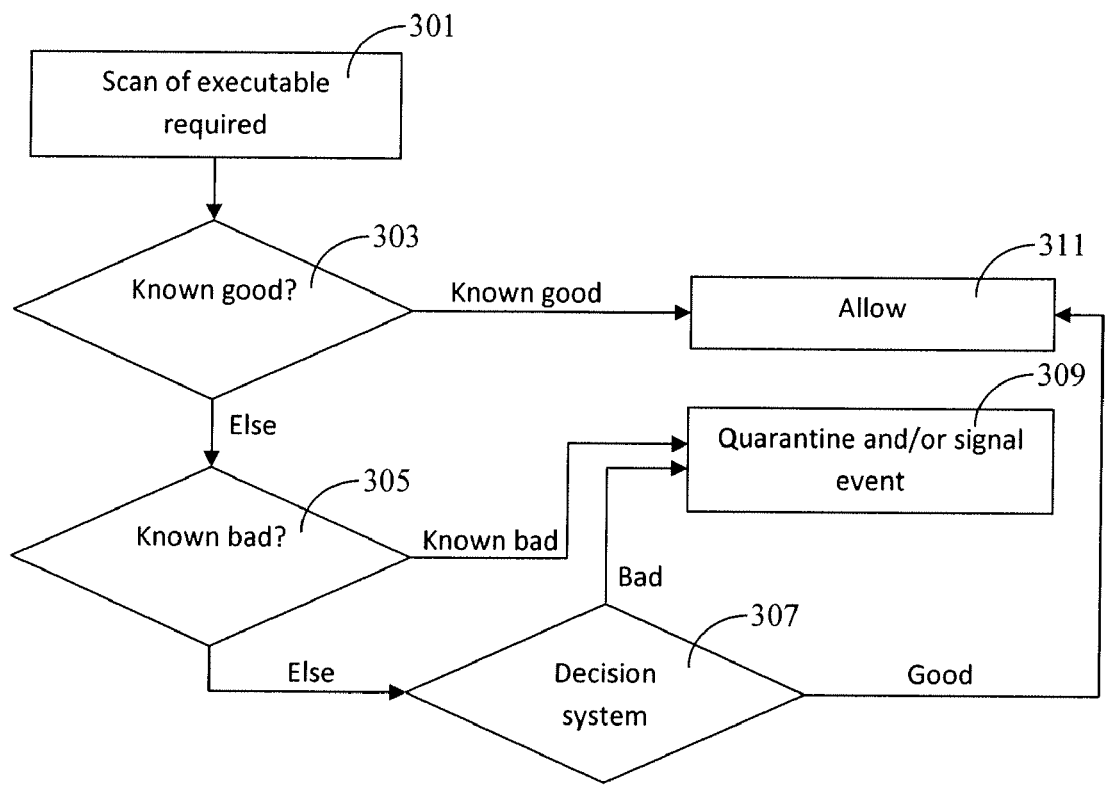
FIG. 3 is an exemplary flow diagram illustrating the steps of an embodiment of the present invention.

FIGS. 2 and 3 provide examples of how the system described above may apply its algorithm for evaluating data to detect malware and prevent attack. FIG. 2 illustrates the present invention evaluating network data or data files. FIG. 3 illustrates the present invention evaluating executable code. Each is discussed in turn.

1. Analysis of Network Data or Data Files

As shown in FIG. 2, step 201 may involve gathering data sent to or received from the mobile communications device. The data may be analyzed to identify its protocol and track state (step 203). One will appreciate that these steps may be performed in whole or in part by the system described in co-pending U.S. patent application Ser. No. 12/255,635. In step 205, known good component 107 may evaluate the gathered data for known good characteristics. Known good characteristics may include the characteristics previously discussed. If the data contains sufficient known good characteristics, it may be allowed to proceed to its intended destination (step 211) for processing, execution or other operation. Alternatively, it may be further analyzed by known bad component 106 to confirm that the data is truly safe (step 207). If known bad component 106 determines that the data is truly safe, then the data may be allowed to proceed to its intended destination (step 211). Decision component 105 may also be available to provide a final check (step 209) before allowing the data to proceed (step 211).

At any point during the analysis, if either known good component 107, known bad component 106 or decision component 105 determines that the data is not good, or affirmatively contains security threats, data inconsistencies, etc., then in step 213 the data will be blocked, rejected, deleted or quarantined. As discussed above, a signal event or security event information log may be updated to record the encounter with the contaminated data.

One will appreciate that the steps illustrated in FIG. 2 are merely exemplary and are not meant to limit the present invention to any one method.

2. Analysis of Executable Data

Like FIG. 2, FIG. 3 similarly depicts and exemplary method for evaluating executable data, including but not limited to applications, programs and/or libraries on the mobile communications device. In step 301, the executable is determined to need to be classified as either good or bad as a result from an attempt to access the executable or the executable being downloaded or otherwise transferred to the mobile device. The executable may or may not be pre-processed to determine a hash identifier or other characteristic before being evaluated by known good component 107. This evaluation may include comparing the executable's hash identifier against a database of known good characteristics, identifying whether the executable has sufficient known good characteristics, or any of the criteria discussed above. If the executable is recognized as known good, then in step 311, it may be allowed to execute its code or proceed to its intended destination for processing or other operation. If known good component 107 fails to allow the executable data, then known bad component 106 may perform its analysis (step 305). If known bad component 106 confirms that the executable is malicious, then the executable may be quarantined, rejected, or deleted, and the event may be logged (step 309). If known bad component 106 is unable to characterize the executable, then the decision component 105 may perform its analysis as described above (step 307). If decision component 105 ultimately determines that the executable is safe, then the executable is allowed (step 311). If decision component 105 ultimately determines that the executable is not safe, or remains unsure, then the executable may be quarantined (step 309). One will appreciate that since executables may contain code that can cause significant harm to the mobile communications device, it may require more rigorous analysis before the executable is allowed to proceed. Any of the steps illustrated in FIG. 3 may be altered without departing from this disclosure or scope of the present invention.

One will appreciate that the above examples contemplate that the present invention operates wholly on a mobile communications device. However, as previously discussed, it is also possible for portions of the present invention to reside on one or more remote servers. In the example of an antivirus system, a file's hash identifier may be transmitted to a remote server that then identifies whether the file is known good or known bad, or if the file contains known good or known bad characteristics. If the server does not recognize the file's hash identifier, the server may request that the file itself be transmitted to the server for analysis. This analysis may be automatic, or may be performed by a human. The server may furthermore analyze access patterns of a given executable between multiple devices to determine if the executable has virus or malware-like spreading characteristics. In an embodiment, analysis on the server is concurrent or in conjunction with an analysis performed by and on the mobile communications device. If the mobile communication device's antivirus system fails to classify the file, it may query the server for its results. Alternatively or in addition, the present invention on the mobile communications device may perform a heuristic analysis using the decision component 105 described above. The results from the local decision component 105 on the mobile communications device may be logged locally and/or transmitted to the server.

As described above, the present invention provides a robust and flexible security system for preventing attacks on a mobile communications device. By implementing the present invention, attacks from cyber-terrorists and other criminal groups may be thwarted. As a result, mobile communications devices can be used for many tasks with a reduced risk of security threats such as exploits, viruses, malware, social engineering attacks, denial of service attacks, and the like.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

provide data on the mobile communications device;

applying a hash function to the data to create a hash identifier for the data;

comparing by the known good component, the data hash identifier against a database of hash identifiers of known good data stored in the mobile communications device memory;

if the comparison by the known good component results in a positive match, then allowing the data to be processed by the mobile communications device;

if the comparison by the known good component does not result in a positive match, then comparing by the known bad component, the data hash identifier against a database stored in the mobile communications device memory containing hash identifiers of known bad data;

if the comparison by the known bad component results in a positive match, then rejecting the data from being processed by the mobile communications device;

if the comparison by the known bad component does not result in a positive match, then using the decision component, performing an analysis on the data by the decision component to determine if the data is safe or malicious;

if the analysis determines that the data is safe, then allowing the data to be processed by the mobile communications device; and if the analysis determines that the data is malicious, then rejecting the data from being processed by the mobile communications device.

2. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

providing data on the mobile communications device;

applying by the known good component, logic on the data to determine if the data is safe;

if the known good component logic determines that the data is safe, then allowing the data to be processed by the mobile communications device;

if the known good component does not determine that the data is safe, then applying by the known bad component, logic on the data to determine if the data is malicious;

if the known bad component logic determines that the data is malicious, then rejecting the data from being processed by the mobile communications device If the known bad component does not determine that the data is malicious, using the decision component, performing an analysis on the data to determine if the data is safe or malicious;

if the analysis by the decision component shows that the data is safe, then allowing the data to be processed by the mobile communications device; and if the analysis by the decision component shows that the data is malicious, then rejecting the data from being processed by the mobile communications device.

3. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

providing data on the mobile communications device;

applying by the known good component, logic on the data to determine if the data is safe;

if the known good component logic determines that the data is safe, then allowing the data to be processed by the mobile communications device;

if the known good component logic does not determine that the data is safe, then applying by the known bad component logic on the data to determine if the data is malicious;

if the known bad component logic determines that the data is malicious, then rejecting the data from being processed by the mobile communications device;

if the known bad component does not determine that the data is malicious, then using the decision component, applying logic on the data for performing an analysis to determine if the data is safe or malicious;

if the decision component determines that the data is safe, then allowing the data to be processed by the mobile communications device; and if the decision component determines that the data is malicious, then rejecting the data from being processed by the mobile communications device.

4. In a server connected through a telecommunications network to receive data from and send data to a mobile communications device, the server having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

by the server, receiving a hash identifier for the data to be analyzed from the mobile communications device;

comparing, by the known good component, the data hash identifier against a database of hash identifiers of known good data stored in memory associated with the server;

if the comparison by the known good component results in a positive match, then sending an instruction to the mobile communications device to allow the data to be processed by the mobile communications device;

if the comparison by the known good component does not result in a positive match, then comparing by the known bad component the data hash identifier against a database stored in memory associated with the server containing hash identifiers of known bad data;

if the comparison by the known bad component results in a positive match, then sending an instruction to the mobile communications to reject the data from being processed by the mobile communications device;

if the comparison by the known bad component does not result in a positive match, then receiving the data from the mobile communications device;

using the decision component, performing an analysis on the data to determine if the data is safe or malicious;

if the decision component determines that the data is safe, then sending an instruction to the mobile communications device to allow the data to be processed by the mobile communications device; and if the decision component determines that the data is malicious, then sending an instruction to the mobile communications device to reject the data from being processed by the mobile communications device.

5. In a server connected through a telecommunications network to receive and send data, having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

receiving data at the server from the mobile communications device;

applying by the known good component, logic on the data to determine if the data is safe;

if the known good component logic determines that the data is safe, then allowing the data to be processed by the mobile communications device;

if the known good component logic does not determine that the data is safe, then rejecting the data from being processed by the mobile communications device;

if the known good component logic does not determine that the data is safe, then applying by the known bad component logic on the data to determine if the data is malicious;

if the known bad component logic determines that the data is malicious, then rejecting the data from being processed by the mobile communications device;

if the known bad component does not determine that the data is malicious, using the decision component, performing an analysis on the data to determine if the data is safe or malicious;

if the decision component determines that the data is safe, then allowing the data to be processed by the mobile communications device; and if the decision component determines that the data is malicious, then rejecting the data from being processed by the mobile communications device.

6. A non-transitory computer readable storage medium for use with a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, the non-transitory computer readable storage medium containing computer readable instructions, which when executed by a processor cause the processor to perform the steps of a method comprising:

applying a hash function to the data to create a hash identifier for the data comparing by the known good component, the data hash identifier against a database of hash identifiers of known good data stored in the mobile communications device memory;

if the comparison by the known good component results in a positive match, then allowing the data to be processed by the mobile communication device;

if the comparison by the known good component does not result in a positive match, then using the known bad component, comparing the data hash identifier against a database stored in the mobile communications device memory containing hash identifiers of known bad data; and if the comparison by the known bad component does not result in appositive match, then using the decision component to determine if the data is safe or malicious;

if the analysis by the decision component shows that the data is safe, then allowing the data to be processed by the mobile communications device; and if the analysis by the decision component shows that the data is malicious, then rejecting the data from being processed by the mobile communications device.

7. A non-transitory computer readable storage medium for use with a server connected through a telecommunications network to receive and send data, having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, the non-transitory computer readable storage medium containing computer readable instructions which when executed by a processor cause the processor to perform the steps of a method comprising:

applying a hash function to the data to create a hash identifier for the data;

comparing by the known good component, the data hash identifier against a database of identifiers of known good data stored in memory associated with the server;

if the comparison by the known good component results in appositive match, then allowing the data to be processed by the mobile communications device;

if the comparison by the known good component does not result in appositive match, then comparing by the known bad component, the data hash identifier against a database stored in memory associated with the server containing hash identifiers of known bad data if the comparison by the known bad component results in a positive match, then rejecting the data from being processed by the mobile communication device;

if the comparison by the known bad component does not result in a positive match, then using the decision component, performing an analysis on the data to determine if the data is safe or malicious;

if the analysis by the decision component shows that the data is safe, then allowing the data to be processed by the mobile communications device; and if the analysis by the decision component shows that the data is malicious, then rejecting the data from being processed by the mobile communications device.

8. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:
- providing data on the mobile communications device;
- comparing by the known good component, the data against a database of characteristics for known good data stored in the mobile communications device;
- if the comparison by the known good component does not result in a positive match, then rejecting the data from being processed by the mobile communications device;
- if the comparison by the known good component results in a positive match, then comparing by the known bad component, the data against a database stored in the mobile communications device memory containing at least one of the data selected from the group consisting of characteristics for known bad data, known bad data signatures, and known bad data patterns;
- if the comparison by the known bad component results in a positive match, then rejecting the data from being processed by the mobile communications device;
- if the comparison by the known bad component does not result in a positive match, then using the decision component, performing an analysis on the data to determine if the data is safe or malicious;
- if the analysis by the decision component shows that the data is safe, then allowing the data to be processed by the mobile communications device; and
- if the analysis by the decision component shows that the data is malicious, then rejecting the data from being processed by the mobile communications device.

9. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:
- providing data on the mobile communications device;
- applying a hash function to the data to create a hash identifier for the data;
- comparing by the known good component, the data hash identifier against a database of hash identifiers of known good data stored in the mobile communications device memory;
- if the comparison by the known good component does not result in a positive match, then rejecting the data from being processed by the mobile communications device;
- if the comparison by the known good component results in a positive match, then comparing by the known bad component, the data hash identifier against a database stored in the mobile communications device memory containing hash identifiers for known bad data;
- if the comparison by the known bad component results in a positive match, then rejecting the data from being processed by the mobile communications device;
- if the comparison by the known bad component does not result in a positive match, then using the decision component, performing an analysis on the data to determine if the data is safe or malicious;
- if the analysis by the decision component shows that the data is safe, then allowing the data to be processed by the mobile communications device; and
- if the analysis by the decision component shows that the data is malicious, then rejecting the data from being processed by the mobile communications device.

10. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:
- providing data on the mobile communications device;
- applying by the known good component, logic on the data to determine if the data is not safe;
- if the known good component logic determines that the data is not safe, then rejecting the data from being processed by the mobile communications device;
- if the known good component logic does not determine that the data is not safe, applying by the known bad component, logic on the data to determine if it is malicious;
- if the known bad component determines that the data is malicious, then rejecting the data from being processed by the mobile communications device;
- if the known bad component does not determine that the data is malicious, then using the decision component, performing an analysis on the data to determine if the data is safe or malicious;
- if the analysis by the decision component shows that the data is safe, then allowing the data to be processed by the mobile communications device; and
- if the analysis by the decision component shows that the data is malicious, then rejecting the data from being processed by the mobile communications device.

11. On a server having a network interface for receiving from and sending data to a mobile communications device having software components for processing and analyzing data, a method comprising:
- after the mobile communications device receives data, and creates a hash identifier for the data, receiving the data hash identifier at the server;
- then, at the server, using a known bad component, comparing the received data hash identifier against a database stored in memory associated with the server containing hash identifiers of known bad data;
- if the data hash identifier comparison by the known bad component results in a positive match, then sending an instruction from the server to the mobile communications device to reject the data from being processed by the mobile communications device;
- if the data hash identifier comparison at the server by the known bad component does not result in a positive match, then at the server, using a known good component, comparing the received data hash identifier against a database of identifiers of known good data stored in a memory associated with the server;
- at the server, if the comparison by the known good component results in a positive match, then sending an instruction by the server to the mobile communications device to allow the data to be processed by the mobile communication device;
- if the comparison by the known good component does not result in a positive match, then, at the server, using a decision component, performing an analysis on the data to determine if the data is safe or malicious;
- if the analysis by the decision component at the server determines that the data is safe, then sending an instruction from the server to the mobile communications device to allow the data to be processed by the mobile communications device; and, if the analysis by the decision component at the server determines that the data is malicious, then sending an instruction from the server to the mobile communications device to reject the data from being processed by the mobile communications device.

* * * * *

UNITED STATES PATENT AND TRADEMARK OFFICE
CERTIFICATE OF CORRECTION

PATENT NO. : 8,108,933 B2  
APPLICATION NO. : 12/255621  
DATED : January 31, 2012  
INVENTOR(S) : Kevin Mahaffey It is certified that error appears in the above-identified patent and that said Letters Patent is hereby corrected as shown below:

In the Claims

Column 14, line 8, in claim 6, delete "appositive" and insert -- a positive --; line 38, in claim 7, delete "appositive" and insert -- a positive --; line 42, in claim 7, delete "appositive" and insert -- a positive --.

Signed and Sealed this
Seventeenth Day of June, 2014

Michelle K. Lee
*Deputy Director of the United States Patent and Trademark Office*